Patented Apr. 1, 1941

2,236,718

UNITED STATES PATENT OFFICE 2,236,718

DECORATIVE ARTICLE AND COATING FOR PRODUCING THE SAME

Alfred B. Poschel, Chicago, Ill., assignor to The Meyercord Company, a corporation of Illinois No Drawing. Application July 10, 1939,
Serial No. 283,637

4 Claims. (Cl. 41—33)

The object of the present invention is to make it possible to provide a surface with a compound decoration, some elements of which are normally wholly or partially concealed, but are automatically rendered visible upon wetting.

In carrying out my invention I employ a coating which, when dry, is opaque or, at least, non-transparent, but which becomes transparent, or more nearly so, upon wetting. This coating, when applied to a surface over an area which is normally to be obscured entirely, or in part, performs its intended purpose while it remains dry but, upon becoming wet and transparent, or more nearly transparent, reveals what was normally hidden underneath the same; and, upon drying, again acts as a cover to hide or substantially change the appearance of that which lies underneath.

The thing which is to be concealed may be a painting, design, marking, or even the natural surface of wood, metal or other material. The coating, however, must be of a composition which will permit it to act in the manner intended and; since I have produced a satisfactory coating for this use, the present invention, in one of its aspects, may be said to have for its object to produce a novel and efficient material which, in layer form, is non-transparent or opaque while, when it becomes wet, loses some of its opacity or becomes completely transparent.

While my invention is applicable to a wide range of uses, it may be employed to advantage in the creation of a changeable picture or other design, and particularly in connection with decalcomanias or transfers which may be applied to a great variety of objects or articles. Thus, for example, a decalcomania having thereon a coating in accordance with my invention may be applied to a drinking glass which, when filled with an iced liquid, causes moisture from the air to condense; such condensation serving to render the concealing coating transparent. Or, the decoration may be placed on the inside of the drinking glass where it comes in direct contact with the contents of the glass.

In order to permit the coating to be employed under a variety of conditions, it must not only be insoluble in water, but also in alcohol and must be capable of resisting soap solutions and the rubbing action of towels or the like.

It is impossible to make the coating of opaque pigments because these remain permanently opaque, and thus it is necessary to employ materials which, in the forms in which they are present in the coating, produce the effect of opacity, when dry, but become transparent when wet. It is a known characteristic of cellulose derivatives that they can be made opaque, without the presence of pigments, through the effect known as "blushing." This, however, requires the use of solvents of very low boiling point which are not suitable when contained in fluid compositions intended for printing or otherwise forming the aspect-changing coatings in commercial production. I have found that "blushing" in cellulose derivatives layers or coatings can be increased by means of a hygroscopic solvent such as glycerine. The quantity of solvents having low boiling points that are needed may be reduced by this means to such an extent that the objections to their presence is no longer serious.

Cellulose acetate constitutes a very good film-forming agent, although other cellulose derivatives, such as nitro-cellulose and actyl cellulose may be used. For some purposes gelatine will do quite well as the film-forming agent.

Layers or coatings consisting of cellulose derivatives are not readily water absorbent and some means must be provided to accelerate the rate at which a cellulose derivative layer can absorb water. This may be done by adding to the cellulose derivative solution finely divided solids which are in white powder form when dry but which, when moistened, become practically colorless. I have found that diatomaceous earth possesses to a high degree these particular characteristics. In order to obtain a greater degree of opacity, in the dry state, some magnesia may be added. Magnesia loses most of its opacity, when moistened. I have found, further, that the water receptivity of the coating, when dry, may be increased by the addition of a small amount of tri-ethanolamine. I have also found it desirable to add a small amount of a plasticizing material for cellulose derivatives as, for example, di-ethyl phthalate, to promote the flexibility of the coating and also the adhesive quality thereof.

It will be obvious that the formula for my new coating material may be widely varied. However, the best results that I have heretofore obtained have been when using a coating composition having the following formula:

| | Parts |
|---|---|
| Cellulose acetate | 20–40 |
| Diatomaceous earth | 10–25 |
| Magnesia | 5–15 |
| Ethyl lactate | 25–50 |
| Acetone | 10–25 |
| Ethylene glycol Monomethyl ether acetate | 5–20 |
| Glycerine | 5–10 |
| Tri-ethanol amine | 3–10 |
| Di-ethyl phthalate | 5–15 |

In the manufacture of decalcomanias embodying the present invention, the decalcomanias, proper, may be produced in the usual way, the design-changing coating being laid down in the same manner as would any varnish or lacquer coating.

The changes in the design or decoration may be made in an almost infinite number of ways. For example, the main ink film of the decalcomania might be of a nude person, the opaque white film providing the clothing and concealing those portions of the body that are ordinarily concealed by such clothing. Upon wetting the coating, the clothing may disappear and make the nude body visible. The white coating might simply cover some portion of the clothing, so as to bring about a change in the color of a stocking, necktie, or other element from white to any other desired color. The underlying design need not be a print or painting nor need it be anything that should literally be referred to as a decoration, as it might constitute an advertisement or a notice of any kind. When I refer to a decoration or design, however, I intend to cover anything whose appearance may be altered by covering it in whole or in part with a translucent or opaque cover. It will also be seen that the coating material may be sold as an article of commerce independently of any object to which it may subsequently be applied, for use by both manufacturers and the general public in coating any desired objects.

I claim:

1. An article bearing a design, and a coating over at least a part of the design to give to the design a variable character, said coating comprising a cellulose derivative, finely divided water-absorbent material, magnesia and a hygroscopic agent.

2. The combination with a decalcomania having a film to be transferred, of a coating over at least a part of said film to give to the latter a variable appearance, said coating comprising a cellulose derivative, solvents therefor, diatomaceous earth, magnesia, and di-ethyl phthalate.

3. The combination with a decalcomania having a color film to give to the latter a variable appearance to be transferred, of a coating over only a part of said film, said coating comprising a cellulose derivative, finely divided water-absorbent material, magnesia, and a hygroscopic agent.

4. An article bearing a design, and a coating overlying only a portion of the design to give to the latter a variable appearance, said coating comprising a cellulose derivative, finely divided water-absorbent material, magnesia, and a hygroscopic element.

ALFRED B. POSCHEL.